United States Patent
Lin et al.

(10) Patent No.: US 10,938,298 B1
(45) Date of Patent: Mar. 2, 2021

(54) POWER CONTROLLER OF LOAD POWER DETECTION

(71) Applicant: INNO-TECH CO., LTD., Taipei (TW)

(72) Inventors: Shu-Chia Lin, Taipei (TW); Chih-Feng Lin, Taipei (TW); Wen-Yueh Hsieh, Taipei (TW); Tsu-Huai Chan, Taipei (TW)

(73) Assignee: INNO-TECH CO., LTD., Taipei (TW)

( * ) Notice: Subject to any disclaimer, the term of this patent is extended or adjusted under 35 U.S.C. 154(b) by 0 days.

(21) Appl. No.: 16/699,806

(22) Filed: Dec. 2, 2019

(30) Foreign Application Priority Data

Oct. 9, 2019 (TW) ................................. 108136541

(51) Int. Cl.
| | | |
|---|---|---|
| *H02M 3/335* | (2006.01) | |
| *H02M 1/00* | (2006.01) | |
| *H02M 1/36* | (2007.01) | |
| *H02M 1/08* | (2006.01) | |
| *H02M 7/217* | (2006.01) | |

(52) U.S. Cl.
CPC ............... *H02M 1/36* (2013.01); *H02M 1/08* (2013.01); *H02M 7/217* (2013.01)

(58) Field of Classification Search
CPC ... H02M 3/33507–33576; H02M 1/36; H02M 2001/0009
See application file for complete search history.

(56) References Cited

U.S. PATENT DOCUMENTS

| | | | | |
|---|---|---|---|---|
| 6,088,244 | A * | 7/2000 | Shioya | H02M 1/32 323/902 |
| 9,343,982 | B2 * | 5/2016 | Yang | H02M 3/33523 |
| 10,291,132 | B2 * | 5/2019 | Kok | H02M 3/33523 |
| 2007/0247879 | A1 * | 10/2007 | Yang | H02M 1/36 363/49 |
| 2008/0259659 | A1 * | 10/2008 | Choi | H02M 1/32 363/50 |
| 2010/0194463 | A1 * | 8/2010 | Moon | H03K 17/0822 327/427 |
| 2013/0229829 | A1 * | 9/2013 | Zhang | H02M 3/33507 363/16 |
| 2017/0222565 | A1 * | 8/2017 | Sonobe | H02M 3/337 |
| 2020/0195150 | A1 * | 6/2020 | Yang | H02M 3/33592 |

* cited by examiner

*Primary Examiner* — Thienvu V Tran
*Assistant Examiner* — Sisay G Tiku
(74) *Attorney, Agent, or Firm* — Lin & Associates Intellectual Property, Inc.

(57) ABSTRACT

A power controller in collocation with a rectification unit, a transformer, a switching unit, a current sensing resistor, an output rectification unit, and an output capacitor is disclosed, and includes a working voltage pin, a ground pin, a PWM driving pin, a current sensing pin, and a load feedback pin for converting an external AC input power into an output power to supply a load. In particular, the power controller simultaneously performs active detection on load power to provide overload protection. Specifically, a load feedback signal related to a load power and a threshold load voltage representative of a preset threshold load power is compared, and a power counter representative of a calculated load power is increased by one, decreased by one, or kept without change according to the comparison result. Then, the power counter is employed to determine whether an overload abnormal event occurs.

9 Claims, 5 Drawing Sheets

POWER CONTROLLER OF LOAD POWER DETECTION

CROSS-REFERENCE TO RELATED APPLICATION

This application claims the priority of Taiwanese patent application No. 108136541, filed on Oct. 9, 2019, which is incorporated herewith by reference.

BACKGROUND OF THE INVENTION

1. Field of the Invention

The present invention relates to a power controller converting an input AC voltage into an output voltage to supply an external load, and more specifically to a power controller provided with active load power detection for overload protection by comparing a load feedback signal and a threshold load voltage, processing a power counter by increasing by one, decreasing by one, or keeping without change, determining overload based on the power counter, stopping a PWM driving signal in case of overload, waiting for a period of time, and recovering the PWM driving signal.

2. The Prior Arts

In general, every electronic device needs an appropriate power for operation like direct current (DC) or alternative current (AC) power, and the demand for voltage and current is also specific and different. For example, integrated circuits (ICs) require DC power with lower voltage such as 1.8V, and electric motors need higher driving voltage and current. In addition, a lamp tube of a liquid crystal (LC) display needs AC power with much higher working voltage.

Thus, it is necessary to provide appropriate power converters for converting the original input power into the desired power to assure normal operation.

In the prior arts, switching power converters providing features of high efficiency of power conversion and convenience for use have been well developed and widely applied to in many electronic products. The switching power converter employs a controller to generate a driving signal with high switching frequency for driving a power transistor as a switch such that the power transistor is rapidly switched on/off to converting the input power into the output power as desired.

As well known, the electronic device is usually sensitive to heat accumulation and temperature increase during operation because higher temperature may cause malfunction, failure, and even permanent damage to some electronic elements. It is thus needed to provide protection mechanism to avoid overload. One of the protection methods is to provide a thermal sensor like thermistor to detect current temperature. When temperature becomes higher and exceeds a present value, resistance of the thermal sensor will dramatically and abruptly change such that the controller detects the change of resistance to determine whether overload occurs and perform protection procedure like immediately ceasing power supply to the load. However, the thermal sensor costs high and occupies a large area of the circuit board to affect circuit layout.

Another method is to use thermal sensing scheme of electronic circuit. Circuit design for thermal sensing scheme is generally more complicated and needs to provide extremely stable bandgap, which is strongly in collocation with special technology provided by fewer chip fundries. Additionally, improvement effect is quite limited.

Therefore, it is greatly needed to provide a new power controller of load power detection, which converts an AC input voltage into an output voltage to supply an external load, and is provided with active power detection for overload protection by comparing a load feedback signal and a threshold load voltage, processing a power counter by increasing by one, decreasing by one, or keeping without change, determining overload based on the power counter, stopping a PWM driving signal in case of overload, waiting for a period of time, and recovering the PWM driving signal, thereby overcoming the problems in the prior arts.

SUMMARY OF THE INVENTION

The primary objective of the present invention is to provide a power controller of load power detection having a working voltage pin, a ground pin, a PWM driving pin, a current sensing pin, and a load feedback pin for converting an external AC input power into an output power to supply a load. In particular, the power controller simultaneously performs active load power detection to provide overload protection.

Specifically, the power controller is in collocation with a rectification unit, a transformer, a switching unit, a current sensing resistor, an output rectification unit, and an output capacitor for operation.

Further, the transformer comprises a primary side coil and a secondary side coil, the rectification unit, the primary side coil, the switching unit, and the current sensing resistor are sequentially connected in serial between the AC input power and the grounded level, and the secondary side coil, the output rectification unit, and the output capacitor are sequentially connected in serial. In addition, the load is connected in parallel to the output capacitor.

Moreover, a primary side current of the primary side coil also flows through the switching unit, and serves as a turn-on current when the switching unit is turned on. A secondary side current flowing through the secondary side coil is generated by the primary side current through electromagnetic induction between the primary side coil and the secondary side coil. The secondary side current further flows through the output rectification unit and the lad, and the output power is generated at the connection of the secondary side coil and the output capacitor. Also, a current sensing signal is generated at the connection of the switching unit and the current sensing resistor.

More specifically, the working voltage pin receives a working voltage for operation, and a regulation unit and a rectification circuit are connected to the working voltage pin. The regulation unit receives and regulates the AC input power, and the rectification circuit is connected to an auxiliary coil coupled with the secondary side coil for receiving an auxiliary voltage, which is generated by the auxiliary coil due to electromagnetic induction with the secondary side current. At the same time, the working voltage is generated by the regulation unit and the rectification circuit.

The ground pin is connected to the grounded level, and the PWM driving pin is connected to the switching unit for transferring the PWM driving signal with a specific period (frequency) to drive the switching unit. In other words, the switching unit is turned on by the PWM driving signal for conduction, or turned off without conduction. The current sensing pin receives the current sensing signal, and the load feedback pin receives a load feedback signal generated by a load feedback circuit connected to the load. Additionally, the load feedback signal corresponds to a voltage (output voltage), current, or power of the load.

Specifically, the power controller of the present invention performs the load power detection by the following steps.

In the step S10, the load feedback signal and the threshold load voltage representative of the threshold load power is compared every a preset power calculation period. In the step S20, the power counter is increased by one if the load feedback signal is larger than the threshold load voltage; in the step S30, the power counter is kept without change if the load feedback signal is equal to the threshold load voltage; and in the step S40, the power counter is decreased by one if the load feedback signal is less than the threshold load voltage.

In the step S50, the power counter and the preset power determination value is compared every a preset power determination period. In the step S60, the overload protection is performed to stop generating the PWM driving signal and turn off the switching unit if the power counter is larger than the power determination value; and in the step S70, the overload protection is not performed and the power controller returns back to the step S10 and repeats the subsequent steps if the power counter is not larger than the power determination value.

Therefore, the power controller of the present invention compares a load feedback signal and a threshold load voltage, processes a power counter by increasing by one, decreasing by one, or keeping without change, and determines overload to provide overload protection based on the power counter, at the same time, further converting the input AC voltage into the output voltage to supply the load.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
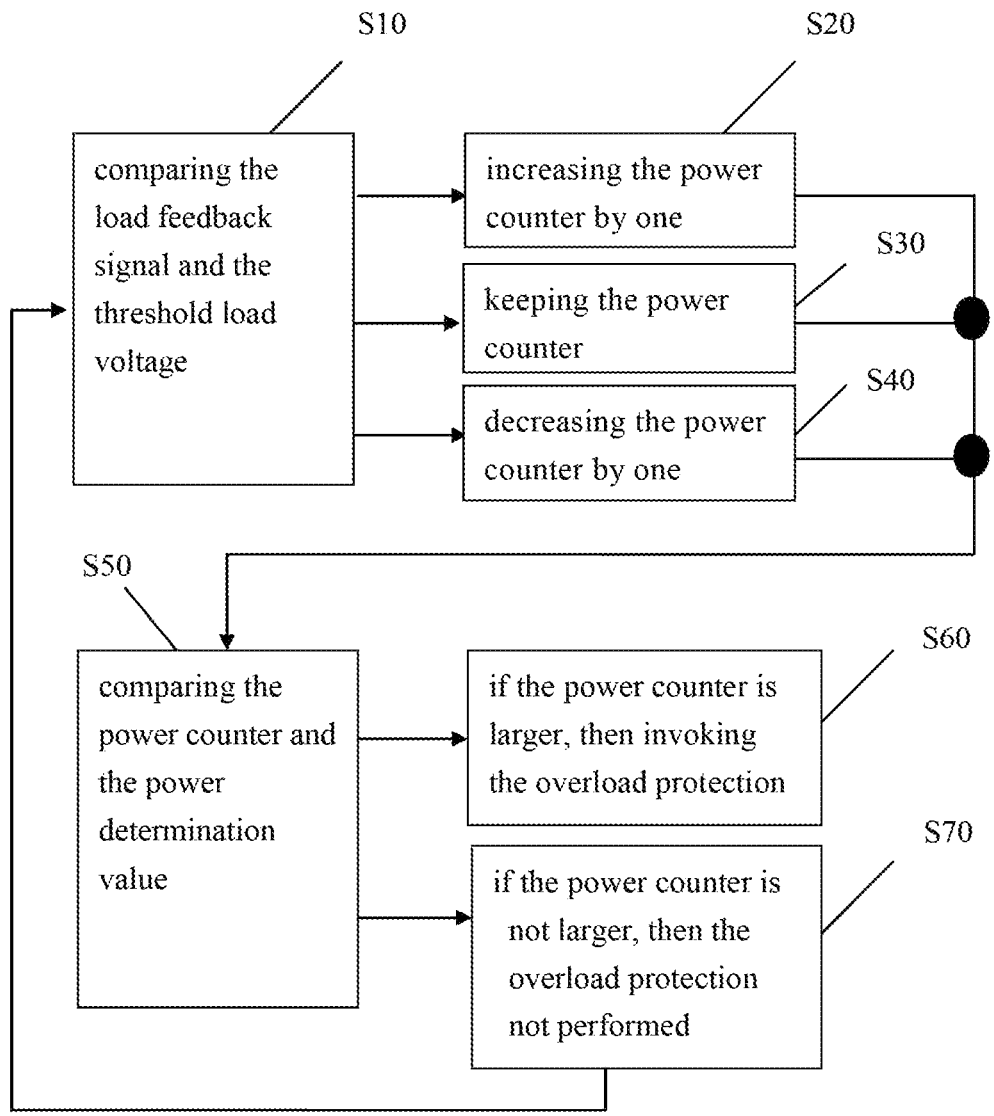
FIG. 1 shows a flowchart of the power controller of load power detection according to the embodiment of the present invention.
Figure 2:
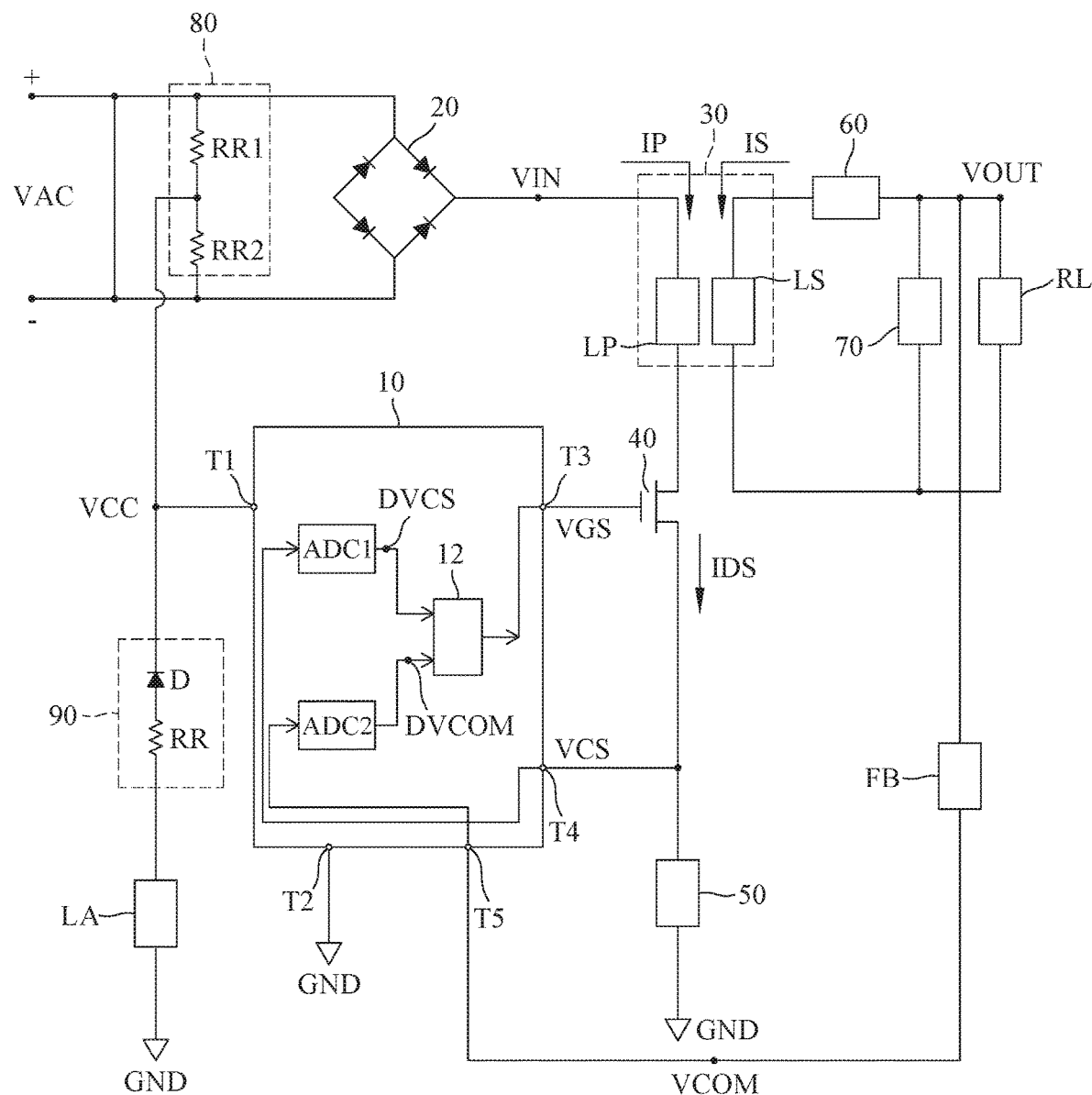
FIG. 2 shows a view of one illustrative example of the power controller according to the embodiment of the present invention.

Please refer to FIG. 1 and FIG. 2. FIG. 1 shows a flowchart of the power controller of load power detection according to the embodiment of the present invention, and FIG. 2 shows a view of one illustrative example of the power controller according to the embodiment of the present invention. As shown in FIGS. 1 and 2, the power controller 10 of load power detection according to the present invention is provided with a working voltage pin T1, a ground pin T2, a Pulse Width Modulation (PWM) driving pin T3, a current sensing pin T4, and a load feedback pin T5 for converting an external AC input power VAC into an output power VOUT, which is supplied to a load RL. At the same time, the power controller 10 performs load power detection to provide overload protection (OLP), which comprises the steps S10, S20, S30, S40, S50, S60, and S70. In particular, the power controller 10 is in collocation with a rectification unit 20, a transformer 30, a switching unit 40, a current sensing resistor 50, an output rectification unit 60, and an output capacitor 70 for operation.

For example, the switching unit 40 comprises a Metal-Oxide-Semiconductor (MOS) element or a bipolar element. However, for clear explanation, the MOS element is illustrated in FIG. 2.

Specifically, the transformer 30 comprises a primary side coil LP and a secondary side coil LS, the rectification unit 20, the primary side coil LP, the switching unit 40, and the current sensing resistor 50 are sequentially connected in serial between the AC input power VAC and the grounded level GND, and the secondary side coil LS, the output rectification unit 60, and the output capacitor 70 are sequentially connected in serial. In addition, the load RL is connected in parallel to the output capacitor 70.

Further, a primary side current IP of the primary side coil LP also flows through the switching unit 40, and serves as a turn-on current IDS when the switching unit 40 is turned on. A secondary side current IS flowing through the secondary side coil LS is generated by the primary side current IP through electromagnetic induction between the primary side coil LP and the secondary side coil LS. The secondary side current IS further flows through the output rectification unit 60 and the lad RL, and the output power VOUT is generated at the connection of the secondary side coil LS and the output capacitor 70. Also, a current sensing signal VCS is generated at the connection of the switching unit 40 and the current sensing resistor 50.

More specifically, the working voltage pin T1 of the power controller 10 receives a working voltage VCC for operation, and a regulation unit 80 and a rectification circuit 90 are connected to the working voltage pin T1. The regulation unit 80 receives and regulates the AC input power VAC, and the rectification circuit 90 is connected to an auxiliary coil LA coupled with the secondary side coil LS for receiving an auxiliary voltage, which is generated by the auxiliary coil LA due to electromagnetic induction with the secondary side current IS. Further, the working voltage VCC is generated by the regulation unit 80 and the rectification circuit 90.

For example, the regulation unit 80 comprises a first voltage division resistor RR1, a second voltage division resistor RR2, and an input capacitor C. The first voltage division resistor RR1 is connected to the second voltage division resistor RR2, the input capacitor C is connected between the grounded level GND and a connection of the first voltage division resistor RR1 and the second voltage division resistor RR2, and the connection of the first voltage division resistor RR1 and the second voltage division resistor RR2 is further connected to the working voltage pin T1. In addition, the rectification circuit 90 comprises a resistor RR and a diode D connected in serial. The resistor RR is connected to the auxiliary coil LA, and the diode D is connected to working voltage pin T1.

The ground pin T2 is connected to the grounded level GND.

The PWM driving pin T3 is connected to the switching unit 40 for transferring the PWM driving signal VGS to drive the switching unit 40 to turn on for conduction or turn off with no conduction. Substantially, the PWM driving signal VGS has a specific period (frequency).

The current sensing pin T4 receives the current sensing signal VCS, and the load feedback pin T5 receives the load feedback signal VCOM, which is generated by the load feedback circuit FB connected to the load RL. The load feedback signal VCOM corresponds to the current, voltage, or power of the load RL. For instance, if the load feedback signal VCOM represents the voltage of the load R (that is, the output voltage VOUT), then load feedback circuit FB is implemented by a photo diode and a photo coupler, which are isolated and do not contact each other. Further, the photo diode receives the output voltage VOUT and transmits a photo signal onto the photo coupler, which converts the photo signal into the load feedback signal VCOM as desired. Thus, the output voltage VOUT is converted into the load feedback signal VCOM through an isolation manner. However, the scope of the present invention is not limited to the illustrative example. For clear explanation hereinafter, the load feedback signal VCOM is exemplarily intended to correspond to the voltage of the load RL (that is, the output voltage VOUT).

Overall, the controller 10 of the present invention generates the PWM driving signal VGS based on the current sensing signal VCS and the load feedback signal VCOM, and employs the current sensing signal VCS to perform load power detection, thereby generating the power counter representative of the average load power.

Since the PWM driving signal VGS generated through the current sensing signal VCS and the load feedback signal VCOM is commonly used in the prior arts, the detailed process is omitted hereinafter.

Figure 3:
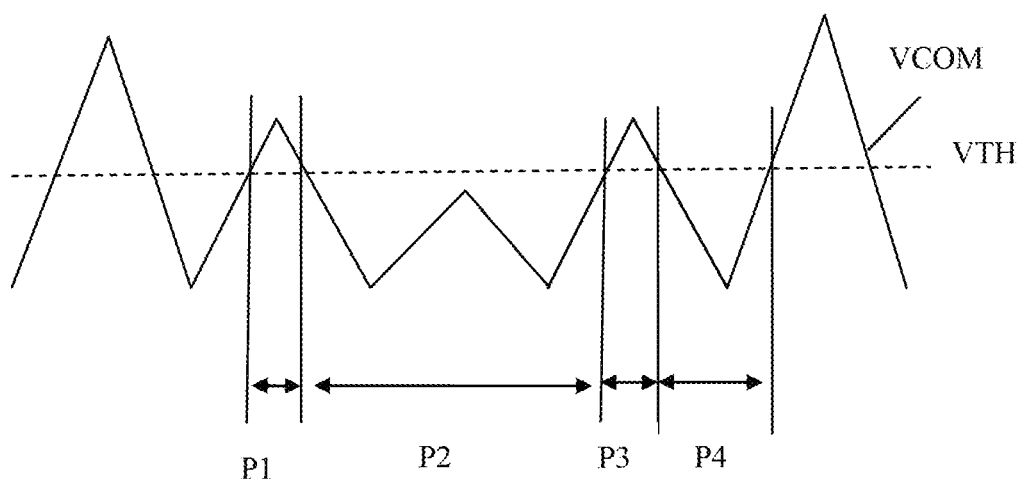
FIG. 3 shows a waveform of load power detection in the power controller according to the embodiment of the present invention.
Figure 4:
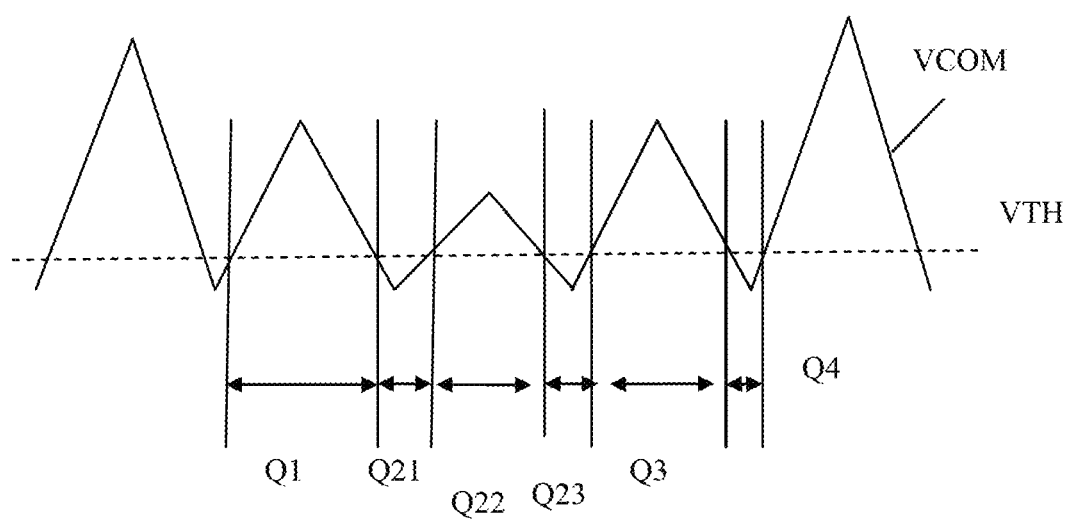
FIG. 4 shows another waveform of load power detection in the power controller according to the embodiment of the present invention.

To describe the aspects of the present invention, refer to FIGS. 3 and 4 illustrating two waveforms of load power detection.

As shown in FIGS. 3 and 4, the step S10 is first performed by comparing the load feedback signal VCOM and the threshold load voltage VTH representative of the threshold load power every a preset power calculation period, and the waveform of the load feedback signal VCOM is a curve with the same variation in the upward and downward directions such as a upward segment and a downward segment. It should be noted that the present invention is not limited by the curve shown in FIG. 4, but substantially comprises other curves like wave.

In the step S20, the power counter is increased by one if the load feedback signal VCS is larger than the threshold load voltage VTH; in the step S30, the power counter is kept without change if the load feedback signal VCS is equal to the threshold load voltage VTH; and in the step S40, the power counter is decreased by one if the load feedback signal VCS is less than the threshold load voltage VTH.

In other words, the above threshold load voltage VTH is a key parameter used to determine whether the system suffers from overload, and the power counter is substantially a parameter intended to represent the average load power. In comparison of the two waveforms of the threshold load voltage VTH shown in FIGS. 3 and 4, it is found that the threshold load voltage VTH in FIG. 3 is higher than the threshold load voltage VTH in FIG. 4. It should be noted that the threshold load voltage VTH is a specific parameter to determine overload, and a lower value of the threshold load voltage VTH means the requirement of overload is more critical to the system.

The waveform shown in FIG. 3 is first described in detail. Each of the time periods P1, P2, P3, P4, and P4 represents the period of time between two adjacent intersections of the load feedback signal VCOM and the threshold load voltage VTH. Further, the time periods P1 and P3 indicate the load feedback signal VCOM is larger than the threshold load voltage VTH, and the power counter representative of the average load power is thus successively increased by one at every power calculation period within the time periods P1 and P3. In addition, the time periods P2 and P4 mean the load feedback signal VCOM is smaller than the threshold load voltage VTH, and the power counter representative of the average load power is thus successively decreased by one at every power calculation period within the time periods P2 and P4.

Obviously, the accumulated time of the time periods P1 and P3 is shorter than the accumulated time of the time periods P2 and P4, and the power counter is thus increased in a smaller scale than decreased. As a result, the average load power is in a decrease tendency from a large scale of time.

Further refer to the waveform shown in FIG. 4. Each of the time periods Q1, Q21, Q22, Q23, Q3 and Q4 represents the period of time between two adjacent intersections of the load feedback signal VCOM and the threshold load voltage VTH. The time periods Q1, Q22, and Q3 indicate the load feedback signal VCOM is larger than the threshold load voltage VTH, and the power counter representative of the average load power is thus successively increased by one at every power calculation period within the time periods Q1, Q22, and Q3. In addition, the time periods Q21, Q23, and Q4 mean the load feedback signal VCOM is smaller than the threshold load voltage VTH, and the power counter representative of the average load power is thus successively decreased by one at every power calculation period within the time periods Q21, Q23, and Q4. Accordingly, the accumulated time of the time periods Q1, Q22, and Q3 is longer than the accumulated time of the time periods Q21, Q23, and Q4, and the power counter is thus increased in a larger scale than decreased. As a result, the average load power is in an increase tendency f from a large scale of time.

In other words, for the same waveform of the load feedback signal VCOM, the power counter is easily increased if the threshold load voltage VTH selected is lower, and therefore, the standard of overload becomes more critical.

After the step S40, the step S50 is performed by comparing the power counter and the preset power determination value every a preset power determination period.

In the step S60, the overload protection is performed to stop generating the PWM driving signal VGS and turn off the switching unit 40 if the power counter is larger than the power determination value. As a result, the primary side current IP is zero, and the secondary side current IS is also zero such that the system stops delivering the output voltage VOUT to the load RL. The elements of the system are well protected to avoid damage due to overload.

In the step S70, if the power counter is not larger than the power determination value, the overload protection is not performed and the power controller 10 returns back to the step S10 and repeats the subsequent steps as mention above.

Therefore, from a larger scale of time period than the power determination period, the situation when the power counter is decreased or increased means the average load power is decreased or increased. For example, the power calculation period can be selected as 10 to 1000 times the period of the PWM driving signal VGS, and the power determination period can be 20 to 2000 times the period of the PWM driving signal VGS.

Figure 5:
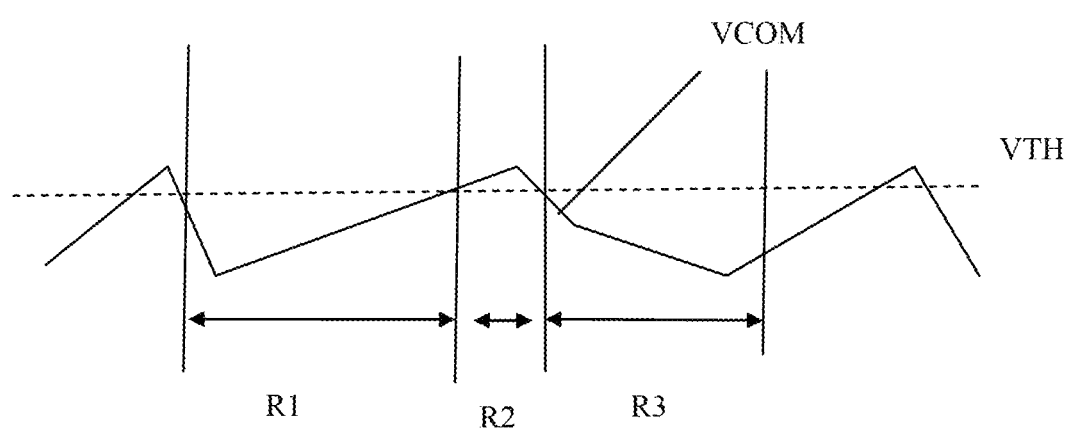
FIG. 5 shows a further waveform of load power detection in the power controller according to the embodiment of the present invention.

Take another example. As shown in FIG. 5, the operation waveform of the load feedback signal VCOM according to the present invention is different from the waveform shown in FIG. 4, but the threshold load voltage VTH is the same.

In FIG. 5, the time periods R1 and R3 indicate the load feedback signal VCOM is smaller than the threshold load voltage VTH, and the power counter is thus decreased by one at every power calculation period within the time periods R1 and R3, that is, progressively monotonic decrease. In addition, the time period R2 means the load feedback signal VCOM is larger than the threshold load voltage VTH, and the power counter is successively increased by one at every power calculation period within the time periods R2, that is, progressively monotonic increase. Since the accumulated time of the time periods R1 and R3 is shorter than the time period R2, the power counter is thus in a decrease tendency. In other word, the operation shown in FIG. 5 does not cause overload.

More specifically, the power controller 10 of the present invention comprises a first analog-to-digital conversion (ADC) unit ADC1, a second ADC unit ADC2, and a digital processing core unit 12. The first ADC unit ADC1 is intended to receive the current sensing signal VCS and generate a digital current sensing signal DVCS, and the second ADC unit ADC2 is intended to receive the load feedback signal VCOM and generate a digital load feedback signal DVCOM. In addition, the digital processing core unit 12 receives the digital current sensing signal DVCS and the digital load feedback signal DVCOM to generate the PWM driving signal VGS and at the same time perform the above mentioned load power detection illustrated in FIG. 1.

Specifically, the digital processing core unit 12 is implemented by a microcontroller (MCU), which executes a specific firmware program, and particularly, the MCU comprises a plurality of digital logic gates, and is not provided with any analog circuit. It is preferred that the power controller 10 comprising the first ADC unit ADC1, the second ADC unit ADC2, and the digital processing core unit 12 is a single chip with high functional integration. Thus, the firmware program is easily updated to change the power calculation period and the power determination period through various tradition processes according to actual requirement so as to implement optimal overload protect.

Obviously, one feature of the present invention is that the load feedback signal and the threshold load voltage representative of the threshold load power is compared to process the power counter by increasing by one, decreasing by one, or keeping without change, and the power counter is further compared with the power determination value to determine whether overload occurs and provide overload protection. Moreover, the AC input power is converted into the output power to supply the load.

Another feature of the present invention is that only the power counter is employed to determine whether overload occurs, and the whole structure is simple and easy to implement through current microelectronic technology. In particular, the power controller comprising the microcontroller provides digital processing ability so as to fast and precisely monitor the average load power and immediately perform overload protection by ceasing the PWM driving signal to turn off the switching unit once overload happens.

Therefore, the elements of the system are well protected without damage, and operation safety of the system is greatly improved.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A power controller in collocation with a rectification unit, a transformer, a switching unit, a current sensing resistor, an output rectification unit, and an output capacitor for converting an external AC input power into an output power to supply a load, the transformer comprising a primary side coil and a secondary side coil, the rectification unit, the primary side coil, the switching unit, and the current sensing resistor sequentially connected in serial between the AC input power and a grounded level, the secondary side coil, the output rectification unit, and the output capacitor sequentially connected in serial, the load connected in parallel to the output capacitor, a primary side current of the primary side coil flowing through the switching unit and serving as a turn-on current when the switching unit turned on, a secondary side current flowing through the secondary side coil being generated by the primary side current through electromagnetic induction between the primary side coil and the secondary side coil, the secondary side current further flowing through the output rectification unit and the load, the output power being generated at a connection of the secondary side coil and the output capacitor, the power controller comprising: a working voltage pin for receiving a working voltage to operate; a ground pin connected to the grounded level; a pulse width modulation (PWM) driving pin connected to the switching unit for transferring a PWM driving signal to the switching unit to drive and turn on the switching unit for conduction or drive to turn off the switching unit for no conduction, the PWM driving signal having a period; a current sensing pin for receiving a current sensing signal; and a load feedback pin for receiving a load feedback signal generated by a load feedback circuit connected to the load, the load feedback signal corresponding to an output voltage, a current, or a power of the load, wherein the power controller generates the PWM driving signal based on the current sensing signal and the load feedback signal, and further employs the load feedback signal to perform load power detection and generate a power counter representative of an average load power of the load, the load power detection comprising steps of: comparing the load feedback signal and a threshold load voltage representative of a threshold load power every a preset power calculation period; increasing the power counter by one if the load feedback signal is larger than the threshold load voltage; keeping the power counter without change if the load feedback signal is equal to the threshold load voltage; decreasing the power counter by one if the load feedback signal is less than the threshold load voltage; comparing the power counter and a preset power determination value every a preset power determination period; an overload protection being performed to stop generating the PWM driving signal and turn off the switching unit if the power counter is larger than the power determination value; and the overload protection not performed and repeating the above steps if the power counter is not larger than the power determination value.

2. The power controller as claimed in claim 1, further comprising:
- a first analog-to-digital conversion (ADC) unit for receive the current sensing signal and generate a digital current sensing signal;
- a second ADC unit for receive the load feedback signal and generate a digital load feedback signal; and
- a digital processing core unit for receiving the digital current sensing signal and the digital load feedback signal to generate the PWM driving signal, and performing the load power detection.

3. The power controller as claimed in claim 2, wherein the digital processing core unit is implemented by a microcontroller (MCU) executing a specific firmware program, and the MCU comprises a plurality of digital logic gates, and is not provided with any analog circuit.

4. The power controller as claimed in claim 1, wherein the preset power calculation period is 10 to 1000 times the period of the PWM driving signal, and the preset power determination period is 20 to 2000 times the period of the PWM driving signal.

5. The power controller as claimed in claim 1, wherein the switching unit comprises a Metal-Oxide-Semiconductor (MOS) element or a bipolar element.

6. The power controller as claimed in claim 1, further comprising a regulation unit and a rectification circuit connected to the working voltage pin, the regulation unit receives and regulates the AC input power, and the rectification circuit is further connected to an auxiliary coil coupled with the secondary side coil for receiving an auxiliary voltage, the auxiliary voltage is generated by the auxiliary coil due to electromagnetic induction with the secondary side current, and the working voltage is generated by the regulation unit and the rectification circuit.

7. The power controller as claimed in claim 6, wherein the regulation unit comprises a first voltage division resistor, a second voltage division resistor, and an input capacitor, the first voltage division resistor is connected to the second voltage division resistor, the input capacitor is connected between the grounded level and a connection of the first voltage division resistor and the second voltage division resistor, and the connection of the first voltage division resistor and the second voltage division resistor is further connected to the working voltage pin.

8. The power controller as claimed in claim 6, wherein the rectification circuit comprises a resistor and a diode connected in serial, the resistor is connected to the auxiliary coil, and the diode is connected to the working voltage pin.

9. The power controller as claimed in claim 1, wherein the load feedback circuit is implemented by a photo diode and a photo coupler.

* * * * *